J. H. KRUSE.
FISH HOOK GUARD.
APPLICATION FILED JULY 27, 1914.

1,166,529.

Patented Jan. 4, 1916.

Witnesses:

Inventor
Julius H. Kruse,
By Glenn S. Noble
Att'y.

UNITED STATES PATENT OFFICE.

JULIUS H. KRUSE, OF CHICAGO, ILLINOIS.

FISH-HOOK GUARD.

1,166,529.  Specification of Letters Patent.  Patented Jan. 4, 1916.

Application filed July 27, 1914. Serial No. 853,430.

*To all whom it may concern:*

Be it known that I, JULIUS H. KRUSE, a citizen of the United States, residing at Chicago, in the county of Cook and State of Illinois, have invented certain new and useful Improvements in Fish-Hook Guards, of which the following is a specification.

Those familiar with the art of fishing fully appreciate the annoyance and difficulty occasioned by having hooks catch on snags or weeds.

The present invention relates to a guard or protecting member which is intended for the purpose of providing a "weedless" hook, or one which is not liable to catch on weeds or similar obstructions. My improved device may also serve to some extent as a lure for attracting the fish. While so-called "weedless" hooks have heretofore been made, they are usually provided with a protecting member, which is supported so that it always tends to return to normal position, that is, it will require a certain amount of force to press it out of protecting position, and then to hold it out of such position. My improved device is so arranged that it may be readily tripped, when the hook is seized by a fish, to disengage the protecting device, which device is then automatically thrown out of normal protecting position.

Among the objects of this invention are to provide a simple and efficient weedless fish hook; to provide a fish hook guard which may be readily adjusted to protecting position; to provide a guard which may be readily attached to ordinary forms of hooks; and in general, to provide such an improved form of device as will appear more fully from the following description.

Figure 1:
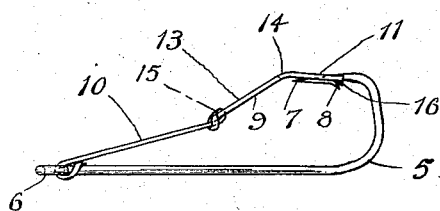
Figure 2:
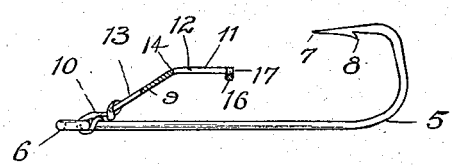
Figure 3:
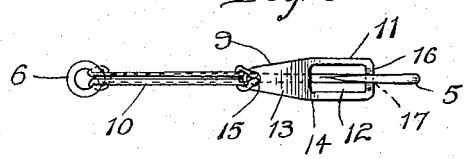
Figure 4:
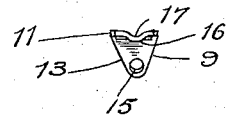

In the accompanying drawings illustrating my invention: Figure 1 is a side view of a hook embodying this invention; Fig. 2 is a similar view showing the guard thrown out of protecting position, a portion of the guard being shown in section; Fig. 3 is a plan view of the device as shown in Fig. 1; and Fig. 4 is an end view of the guard proper.

As illustrated in these drawings, 5 indicates a fish hook of any ordinary or preferred form, with an eye 6 at one end for attachment to the string or leader; and with a sharp point 7 at the other end, and the usual barb 8. The guard 9 engages with the barb 8, and is shaped so as to protect the point 7. This guard is connected to the eye 6 or inner end of the hook by means of a resilient member 10. In its preferred form, the guard 9 comprises a plate made from sheet metal, comprising an outer substantially rectangular portion 11, with a hole 12 therein; and an inner portion 13, with diverging sides. This plate is bent as indicated at 14, so as to throw the nip or bend slightly above the point 7 when the inner portion 13 is substantially in alinement with the resilient member 10. The inner end of the portion 13 is provided with a hole 15 for engagement with the resilient member 10, which member preferably comprises an ordinary rubber band. The cross bar 16 forming the outer end of the rectangular portion 11 engages directly with the barb 8, and is bent downwardly to form a groove 17, which engages with the portion of the hook adjacent to the barb in the manner shown in the drawings. This bend or depression in the cross bar 16 tends to centralize the guard on the inwardly turned part of the hook, and at the same time permits a slight rocking motion of the guard as it is passing through the water. The cross bar 16 is so proportioned that the guard will remain in proper position when the hook is being drawn through the water, but at the same time may be readily disengaged by downward pressure on the guard, either at the center thereof or at either side.

When the hook is to be used, it is baited and the guard arranged in the position shown in Fig. 1, with the rubber band or resilient member 10 drawn sufficiently tight to hold the same in position as the hook is drawn through the weeds. When in this position, the upper end of the part 13 preferably extends slightly beyond the hook so as to fully protect the same, and this portion will ward off any weeds or the like. The guard may be highly polished if desired, and made in such form as may also serve to attract the fish. In passing through the water, there is a tendency toward a rocking motion of the guard with respect to the hook, which further serves to interest the fish. When a strike occurs, the guard will ordinarily remain in position until the fish closes his mouth against the guard, thereby disengaging it from the barb, or tends to draw away on the hook, thereby pressing inwardly and backwardly on the part 13, which assures the quick disengagement of the guard. As soon as the guard is disengaged from the barb, the rubber band 10 will draw the guard forwardly to a free position, for instance as indicated in Fig. 2.

By means of my improved device, the fisherman's troubles are largely obviated, and he is practically assured of securing his fish in the case of a strike, or when the fish attempts to bite on the hook, as the guard, when tripped, will instantaneously move out of protecting position and will permit the point of the hook to engage with the mouth of the fish.

It will be readily apparent that my improved guard may be made in various forms and shapes and may be modified as desired for different styles of hooks or different conditions, without departing from the spirit of this invention.

Having thus described my invention, what I claim and desire to secure by Letters Patent is:

1. A guard for fish hooks, comprising a plate having a cross bar at one end thereof for engagement with the barb of a hook, and having an opening for receiving the point of the hook, said plate being bent toward the shank of the hook, and a resilient member adapted to connect between the inner end of the bent portion and the shank of the hook for normally holding the cross bar in engagement with the barb and adapted to pull the plate toward the shank when the plate is released.

2. The combination with a fish hook, of a guard having a member for engagement with the barb of the hook, said guard extending forwardly having a flat surface to protect the point, and a resilient connection between the guard and the eye of the hook for holding said guard in engagement with the barb, and for pulling said guard forwardly when the guard is disengaged from the barb.

3. The combination with a fish hook, of a metallic plate having a hole therein for receiving the point of the hook, and having a downwardly bent cross bar for engagement with the hook above the barb, said plate being bent toward the shank of the hook, and a rubber band connecting between the forward end of the plate and the eye of the hook, the arrangement being such that the band will hold the guard with the bent portion extending outwardly beyond the point of the hook when in adjusted position.

4. A hook guard comprising a plate bent at about the center thereof, with a hole in one end, and a rectangular opening in the opposite end, with a cross bar at the end having the rectangular opening, said cross bar being bent to form a groove in the upper surface thereof, and being adapted to engage with the barbed portion of a fish hook, substantially as described.

JULIUS H. KRUSE.

Witnesses:
E. H. TILLSON,
E. V. GUSTAFSON.

Copies of this patent may be obtained for five cents each, by addressing the "Commissioner of Patents, Washington, D. C."